US008040003B2

(12) United States Patent
Takahashi et al.

(10) Patent No.: US 8,040,003 B2
(45) Date of Patent: Oct. 18, 2011

(54) OUTER ROTOR TYPE MULTIPOLAR GENERATOR

(75) Inventors: Masahiro Takahashi, Saitama (JP); Yoshihisa Hirose, Saitama (JP); Yoichi Yamamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 395 days.

(21) Appl. No.: 12/264,611

(22) Filed: Nov. 4, 2008

(65) Prior Publication Data

US 2009/0115271 A1 May 7, 2009

(30) Foreign Application Priority Data

Nov. 7, 2007 (JP) ................................. 2007-289578

(51) Int. Cl.
H02K 11/00 (2006.01)
(52) U.S. Cl. .......................... 310/71; 310/184; 310/198
(58) Field of Classification Search .................... 310/71, 310/184, 198
See application file for complete search history.

(56) References Cited

U.S. PATENT DOCUMENTS

| 2,659,045 | A | * | 11/1953 | Rona | 322/27 |
| 3,824,682 | A | * | 7/1974 | Tharman | 29/596 |
| 3,940,646 | A | * | 2/1976 | Buckman | 310/166 |
| 4,754,207 | A | * | 6/1988 | Heidelberg et al. | 318/400.41 |
| 5,194,775 | A | * | 3/1993 | Cooper | 310/260 |
| 5,723,930 | A | * | 3/1998 | Ho et al. | 310/179 |
| 5,874,795 | A | * | 2/1999 | Sakamoto | 310/156.12 |
| 6,030,260 | A | * | 2/2000 | Kikuchi et al. | 439/890 |
| 6,091,172 | A | * | 7/2000 | Kakinuma et al. | 310/71 |
| 6,759,780 | B2 | * | 7/2004 | Liu et al. | 310/184 |
| 6,844,650 | B2 | * | 1/2005 | Hirano et al. | 310/198 |
| 6,965,182 | B2 | * | 11/2005 | Jeong et al. | 310/180 |
| 2001/0002776 | A1 | * | 6/2001 | Suzuki et al. | 310/71 |
| 2005/0067909 | A1 | * | 3/2005 | Ahn et al. | 310/179 |
| 2006/0103247 | A1 | * | 5/2006 | Kotajima | 310/71 |
| 2006/0175917 | A1 | * | 8/2006 | Nanbu et al. | 310/71 |
| 2010/0096939 | A1 | * | 4/2010 | Shinkawa | 310/71 |

FOREIGN PATENT DOCUMENTS

| JP | 11-150905 A | 6/1999 |
| JP | 2000-78810 A | 3/2000 |
| JP | 2002-165397 A | 6/2002 |

* cited by examiner

*Primary Examiner* — Quyen Leung
*Assistant Examiner* — Alex W Mok
(74) *Attorney, Agent, or Firm* — Westerman, Hattori, Daniels & Adrian, LLP

(57) ABSTRACT

Present invention prevents connection terminals for connecting stator windings to external conductive wires from densely concentrating on a bobbin. A multipolar generator includes a stator core 10 on which salient poles 11 of integral multiples of "3" are provided, and main windings 17 wound around the salient poles 11. Auxiliary machine windings 18 to 20 in place of the main winding 17 are wound around at least one of three salient poles 11 provided at intervals of integral multiples of "3" from the salient poles 11 of both ends of six continuous salient poles 11 around which the winding start and winding finish of the main winding 17 are wound. The auxiliary windings are arranged each other at intervals of integral multiples of "3". When the number of the auxiliary windings is 2 or less, the salient pole 11 around which the other auxiliary winding should be wound, is empty.

4 Claims, 9 Drawing Sheets

OUTER ROTOR TYPE MULTIPOLAR GENERATOR

BACKGROUND OF THE INVENTION

1. Field of the Invention

The present invention relates to an outer rotor type multipolar generator. In particular, the present invention relates to an outer rotor type multipolar generator suitable for avoiding congestion of terminals for connecting end parts of stator windings to easily automate the connection work between the stator winding and the terminal.

2. Description of the Related Art

There has been known an outer rotor type multipolar generator having a stator and a rotor. The stator has stator windings wound around a large number of salient poles provided on the outer periphery of a stator core. The rotor has a plurality of permanent magnets arranged on the outer periphery of the stator so as to face the salient poles. Examples of the outer rotor type multipolar generators include one using stator windings wound around all of a large number of salient poles as main windings for taking out three-phase AC, and one using stator windings wound around some of a large number of salient poles (for example, three salient poles) as auxiliary windings for taking out single-phase AC.

For example, Japanese Patent Application Laid-Open (JP-A) No. 11-150905 describes an outer rotor type multipolar generator having a stator in which main windings for three-phase AC output are wound around twenty-four salient poles of twenty-seven stator cores, and a charge winding, a sub-winding and a DC winding as auxiliary windings are wound around the other three salient poles. In this outer rotor type multipolar generator, connection terminals for connecting the stator windings to external conductive wires are fitted and fixed to an insulating bobbin for the stator core. The leading portions of the stator windings can be connected to the connection terminals by fusing to facilitate the connection work.

JP-A No. 2002-165397 describes an outer rotor type multipolar generator having a stator in which main windings are wound around eighteen salient poles of twenty-one salient poles while a DC winding is wound around two salient poles and a sub-winding and an exciter winding are wound around one salient pole. In this outer rotor type multipolar generator, an insertion hole penetrating in a core plate laminating direction of a stator core is formed in a bobbin. The leading portion of the stator winding passed from one side of the insertion hole to the other side, and is exposed to the side surface of the bobbin. The leading portion is connected to a connection terminal arranged on this side surface.

Since a plurality of auxiliary winding are collectively arranged adjacent to one another between the main windings in the outer rotor type multipolar generator described in the above Patent Documents, the leading portions of the three-phase main windings and the leading portions of the single phase auxiliary windings concentrate on the inner periphery side of the stator core. Since the connection terminals for connecting the leading portions to the external conductive wires are advantageously arranged closely to the leading portions, the connection terminals concentrate on the bobbin on the inner periphery side of the stator core. For example, twelve connection terminals of six connection terminals for three-phase main winding and six connection terminals for single phase auxiliary winding concentrate on the partial region of the side surface of the bobbin.

Thus, when the connection terminals are intensively arranged on the bobbin on the inner periphery side of the stator core, the main winding and auxiliary winding connected to the connection terminals and being dissimilar voltage different from one another needs to be insulated, and it is difficult to automate work for drawing the stator winding to the connection terminal.

Alternatively, when the stator winding is connected to the connection terminal by soldering or fusing (heat caulking) or the like, for example, as described in JP-A No. 11-150905, in order to avoid fusing or the like in a congestion position, it is necessary to provide a step of connecting the stator winding to the connection terminal erected on the side surface of the bobbin using fusing and a forming step of bending the connection terminal along the side surface of the bobbin after fusing. This is because work for pushing an energization electrode against the connection terminal for fusing in a narrow place is not suitable for automation.

Alternatively, examples of the outer rotor type multipolar generators include a type (hereinafter, referred to as a "full main winding type") containing no auxiliary winding and a type containing the auxiliary winding, as described above. Both the types can advantageously use the bobbin commonly. However, when the auxiliary winding is not contained, the main winding wound in a position in which auxiliary winding has existed must be wound around the other salient pole located farther to extend over three salient poles from the winding start or the salient pole of the winding start, and the automation of wiring is not easy. That is, the bobbin cannot be commonly used for the full main winding type.

SUMMARY OF THE INVENTION

The present invention has been made in view of the above problem. It is an object of the present invention to provide an outer rotor type multipolar generator which can avoid congestion of connection terminals provided on a bobbin to automate connection work between a stator winding and a connection terminal and can attain communalization of the bobbin.

The present invention has a first feature in that an outer rotor type multipolar generator includes: an annular stator core having an outer periphery on which salient poles of integral multiples of "3" of 12 or more are arranged; and three-phase main windings wound around the salient poles through an insulating bobbin, wherein an auxiliary winding in place of a main winding is wound around at least one of three salient poles arranged at intervals of integral multiples of "3", and when the number of the auxiliary windings is 2 or less, the winding is not wound around the salient pole around which the other auxiliary winding should be wound, is empty.

The present invention has a second feature in that the bobbin includes a region overhung toward an internal diameter side of the annular stator, and main winding connection terminals and auxiliary winding connection terminals are fixed to the region, wherein the main winding connection terminals and the auxiliary winding connection terminals respectively connecting the main windings and the auxiliary windings to external windings.

Furthermore, the present invention has a third feature in that the main windings are bonded to the main winding connection terminals by fusing, and the auxiliary windings are bonded to the auxiliary winding connection terminals by fusing.

According to the present invention having the first feature, the auxiliary windings are arranged every at least three of the salient poles around which the main windings are wound. The leading parts of the auxiliary windings are led in a position detached by at least three salient poles. Thereby, congestion of the leading parts of the main windings and auxiliary windings can be avoided, and the drawing of the leading parts is easily automated. Alternatively, three salient poles are provided so that three auxiliary windings can be provided, and the main windings are not wound around the three salient poles. Thereby, the same winding number can be thinned from each of the three-phase main windings. Therefore, the output balance of each of the phases due to the three-phase main windings can be maintained.

Alternatively, when the bobbin is diverted to the full main winding type in the conventional stator in which the auxiliary windings are wound around the continuous three salient poles between the main windings, the main winding wound in a position in which auxiliary winding exists is wired around the salient pole located farther to extend over three salient poles from the winding start or the salient pole of the winding start, and the automation of wiring is not easy. Since the main winding is wound around the salient pole in which the auxiliary winding is empty even in the full main winding type having no auxiliary winding in the present invention having the first feature, and the main winding is wound around the salient pole nearby located, the main winding is not led far. Therefore, the bobbin of the same form can be shared irrespective of the existence of the auxiliary winding.

According to the present invention having the second feature, the main winding connection terminals and auxiliary winding connection terminals do not densely concentrate in a narrow region of the inner periphery side of the bobbin. Therefore, a space for each of the connection works of the main windings and auxiliary windings, and of the main winding connection terminals and auxiliary winding connection terminals can be sufficiently secured.

The connection terminals and the leading parts of winding do not densely concentrate according to the present invention having the third feature. Therefore, when the main windings and the auxiliary windings are respectively connected to the main winding connection terminals and the auxiliary winding connection terminals by fusing, a sufficient space for inserting an electrode for fusing can be secured.

DETAILED DESCRIPTION OF THE PREFERRED EMBODIMENT

Figure 2:
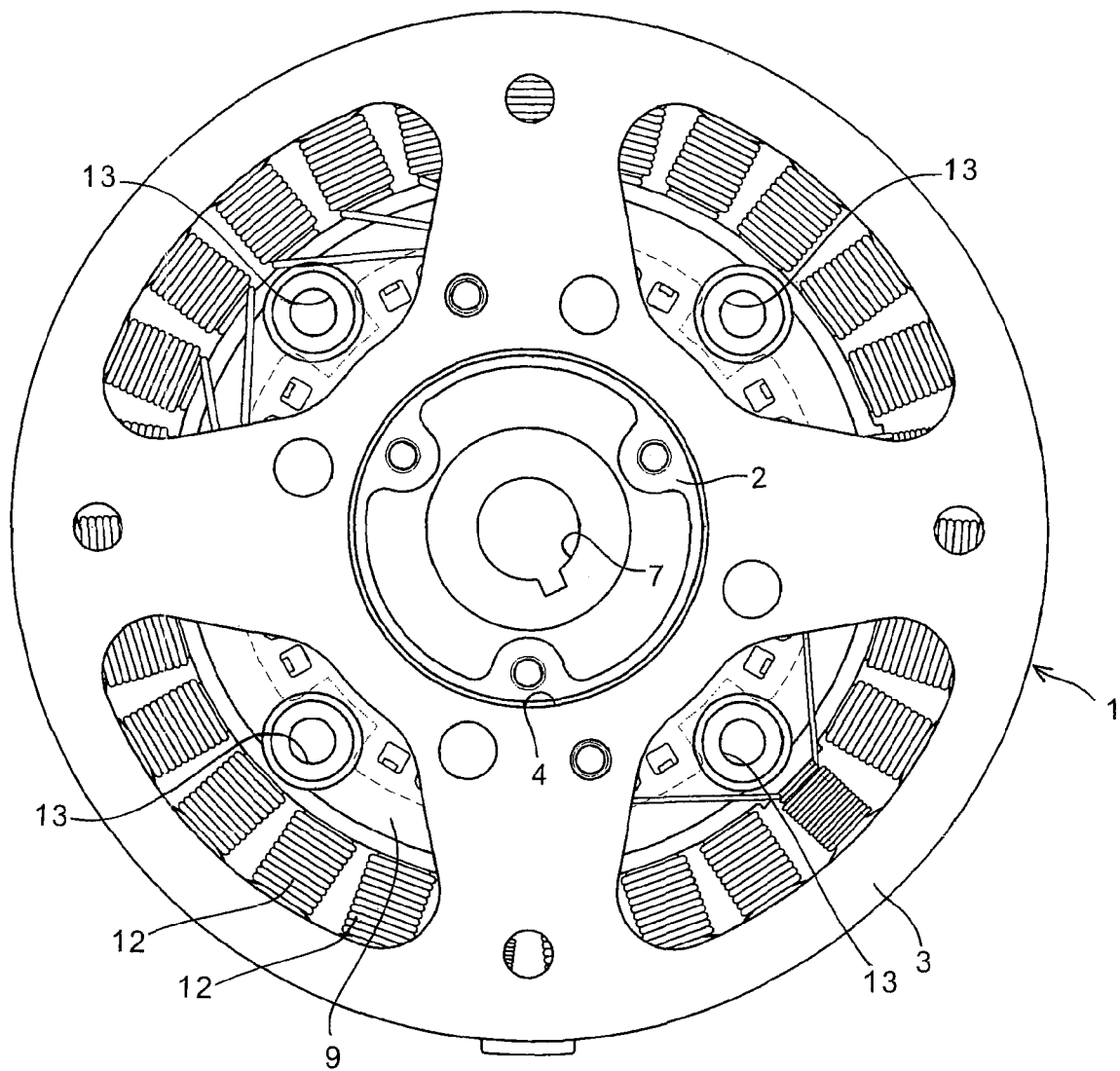
FIG. 2 is a front view of the outer rotor type multipolar generator according to the embodiment of the present invention.
Figure 3:
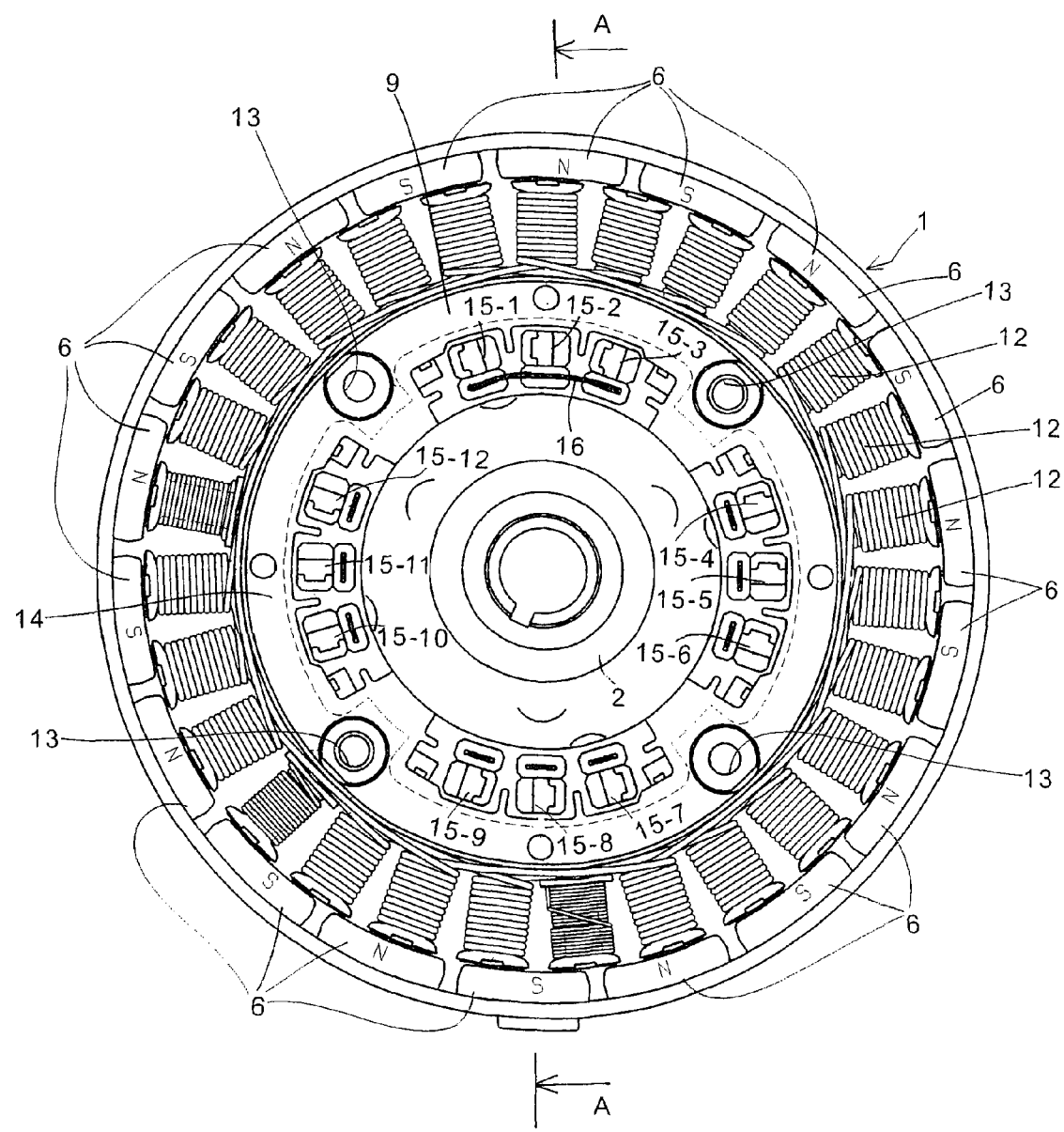
FIG. 3 is a rear view of the outer rotor type multipolar generator according to the embodiment of the present invention.
Figure 4:
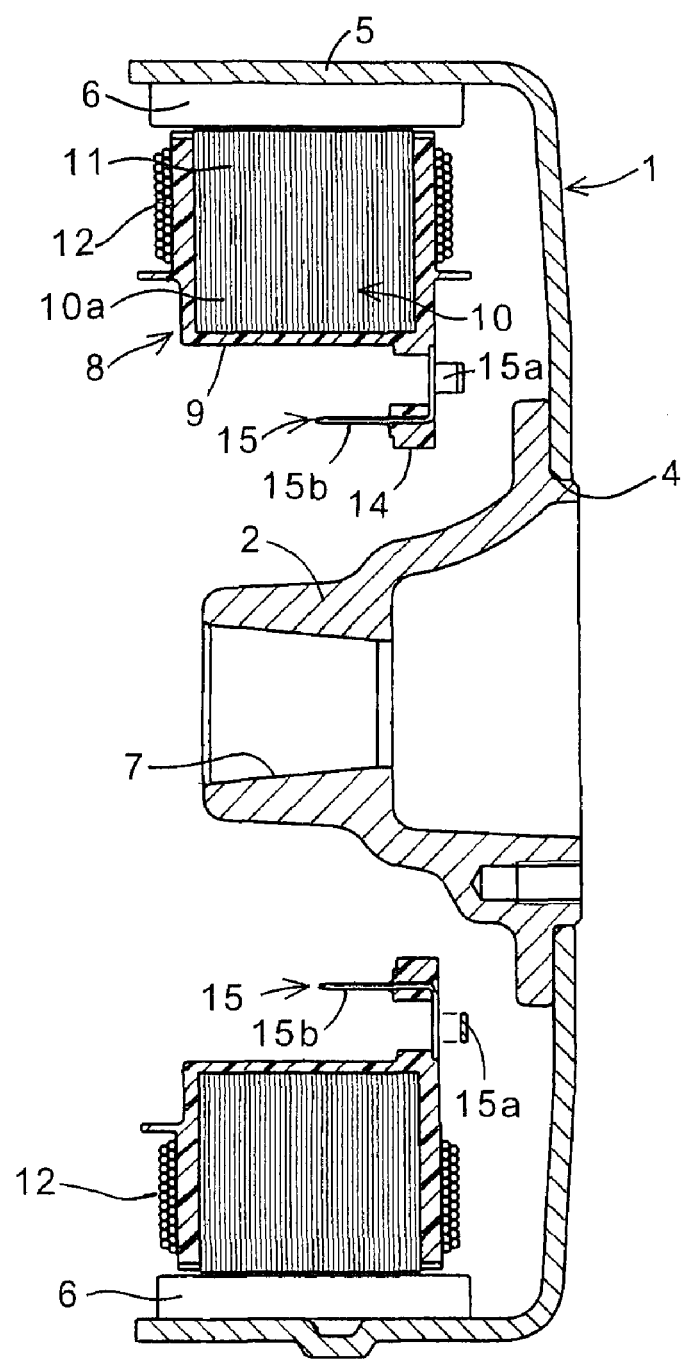
FIG. 4 is a sectional view of the outer rotor type multipolar generator according to the embodiment of the present invention.

The present invention will be described in detail with reference to the drawings. FIG. 2 is a front view of an outer rotor type multipolar generator according to an embodiment of the present invention. FIG. 3 is a rear view thereof. FIG. 4 is a sectional view taken in line A-A in FIG. 3. In FIGS. 2 to 4, an outer rotor 1 is provided with a boss 2 and a rotor yoke 3 bonded to the boss 2. The rotor yoke 3 has a bowl shape in whole. The rotor yoke 3 has a hole 4 formed in the bottom part of the bowl shape, the end part of the boss 2 is inserted into the hole 4. On the other hand, a plurality of field permanent magnets 6 are stuck on the peripheral part of the rotor yoke 3, i.e., the inner peripheral surface of a bowl-shaped side wall part 5. In this example, eighteen permanent magnets 6 are arranged so that the polarities of the adjacent permanent magnets are reversed. The boss 2 has a taper hole 7 for connecting the boss 2 to an output shaft end part of a drive source which is not shown, i.e., an engine.

A stator 8 is arranged inside the outer rotor 1. The stator 8 includes a bobbin 9 made of an insulating material (for example, synthetic resin), a stator core 10 covered in an insulating manner excluding the peripheral part by the bobbin 9, and stator windings 12 wound around the salient poles 11 of the stator core 10 through an insulating wall of the bobbin 9. The stator windings 12 will be further described in detail.

The stator core 10 includes an annular base part 10a located nearer the inner periphery, i.e., on the side of the boss 2 of the outer rotor 1, and a plurality of salient poles 11 radially projected from the annular base part 10a. In this embodiment, twenty-seven salient poles are formed. The stator core 10 is formed by punching core plates from a thin plate made of silicon steel and laminating the punched core plates. Bolt insertion holes 13 are also formed in forming the core plates. The bolt insertion holes 13 are formed in order to mount the stator 8 to a crankcase or the like of the engine using bolts, the engine being a drive source for an electric generator. In this embodiment, the bolt insertion holes 13 are formed in four portions. Since the bolts penetrate the stator core 10 and the bobbin 9, the bolt insertion holes are also formed in the bobbin 9.

The bobbin 9 has a part extending to the inner periphery, i.e., the side of the boss 2 from a portion covering a base part 10a of the stator core 10, i.e., a connection terminal holding part (holding region) 14. Twelve connection terminals 15 are provided on this connection terminal holding part 14. The connection terminal 15 include a fusing portion 15a located on the one side of the connection terminal holding part 14, i.e., the bottom part of the rotor yoke 3, and a coupler pin 15b provided so as to penetrate to the other side of the connection terminal holding part 14. The fusing portion 15a is formed in a hook shape so that the leading portion of the stator windings 12 can be sandwiched. The coupler pin 15b is formed in a plane shape or in a tongue shape so that the coupler pin 15b can be connected to an external conductor side coupler socket which is not shown. The fusing is carried out by pushing electrodes against the hook-shaped fusing portion 15a and transforming the fusing portion 15a while heating the fusing portion 15a to press-contact the stator windings 12.

As shown in FIG. 3, three connection terminals 15 are dispersed in each of regions sandwiched between the bolt insertion holes 13 to provide twelve connection terminals in total. The six connection terminals (15-1 to 15-6) of these twelve connection terminals 15 are used for connecting main windings for three-phase AC output, and the other six connection terminals (15-7 to 15-12) are used for connecting auxiliary windings. The three connection terminals 15 (15-1 to 15-3), which serve as a neutral point of the main winding, are connected to one another by a connecting plate 16. This example shows the case where the auxiliary windings are included in the stator windings 12. In a full main winding type which does not include the auxiliary windings, the connection terminals 15-7 to 15-12 located in a position in which the auxiliary winding is connected are empty, and are not used.

Figure 1:
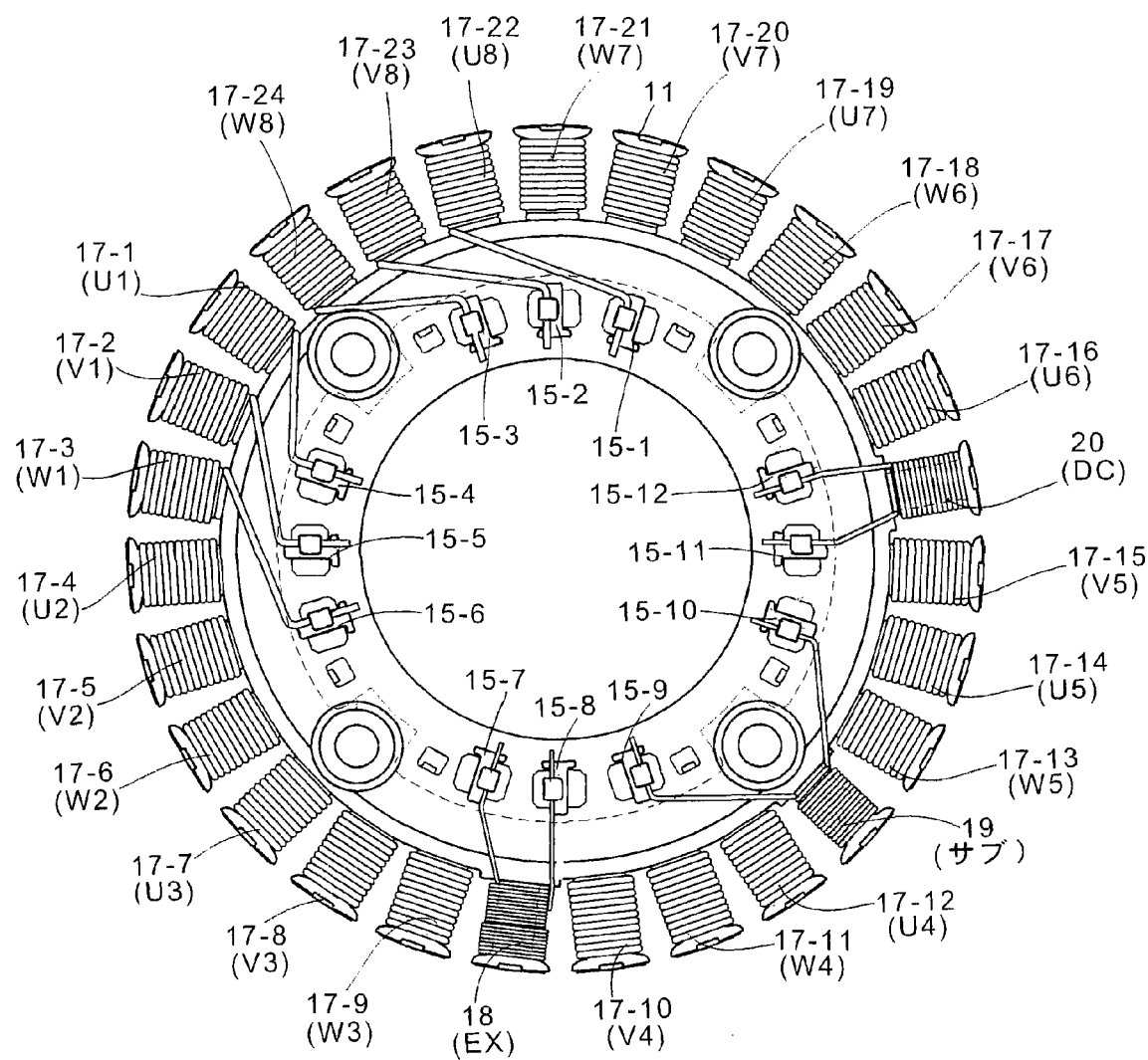
FIG. 1 is a front view of a stator included in an outer rotor type multipolar generator according to an embodiment of the present invention.
Figure 5:
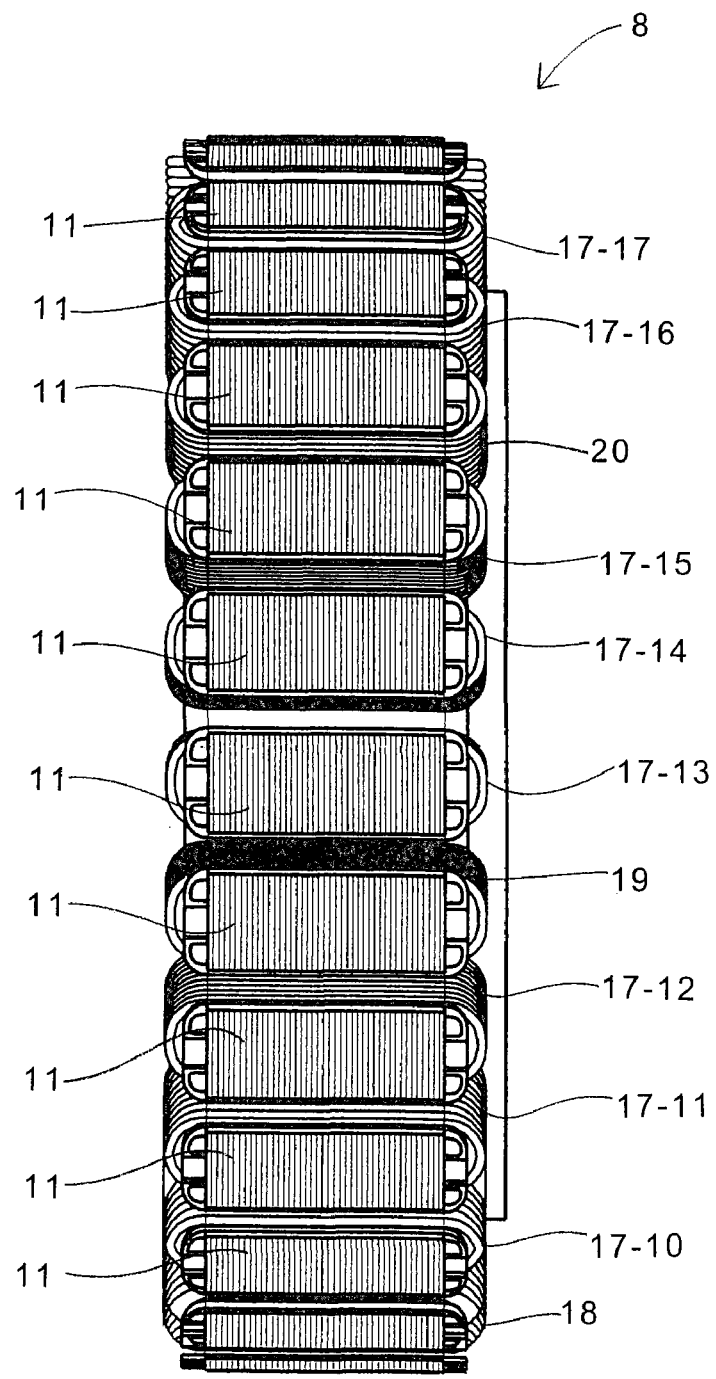
FIG. 5 is a side view of a stator.
Figure 6:
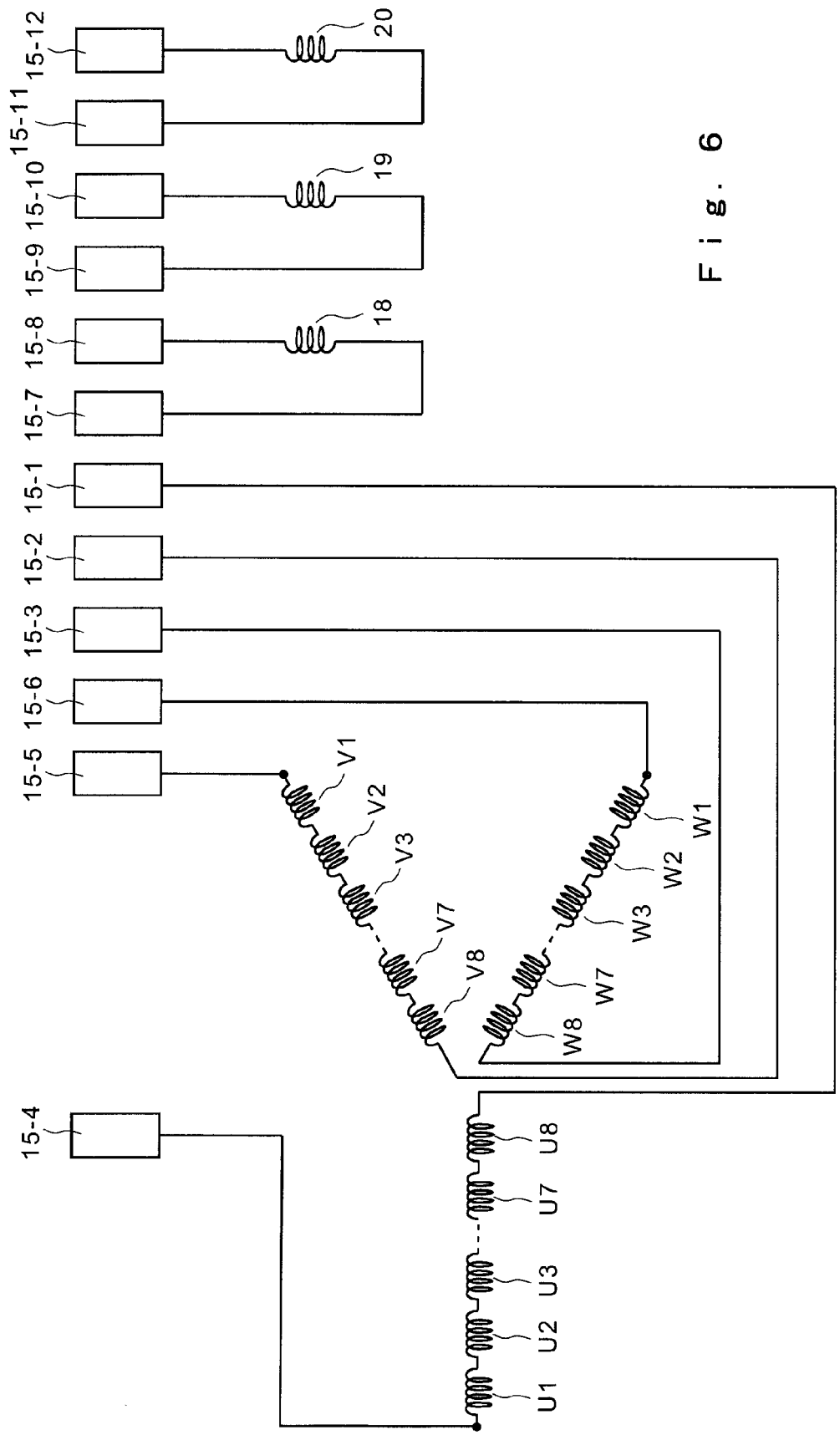
FIG. 6 is a wiring diagram of a stator winding.
Figure 7:
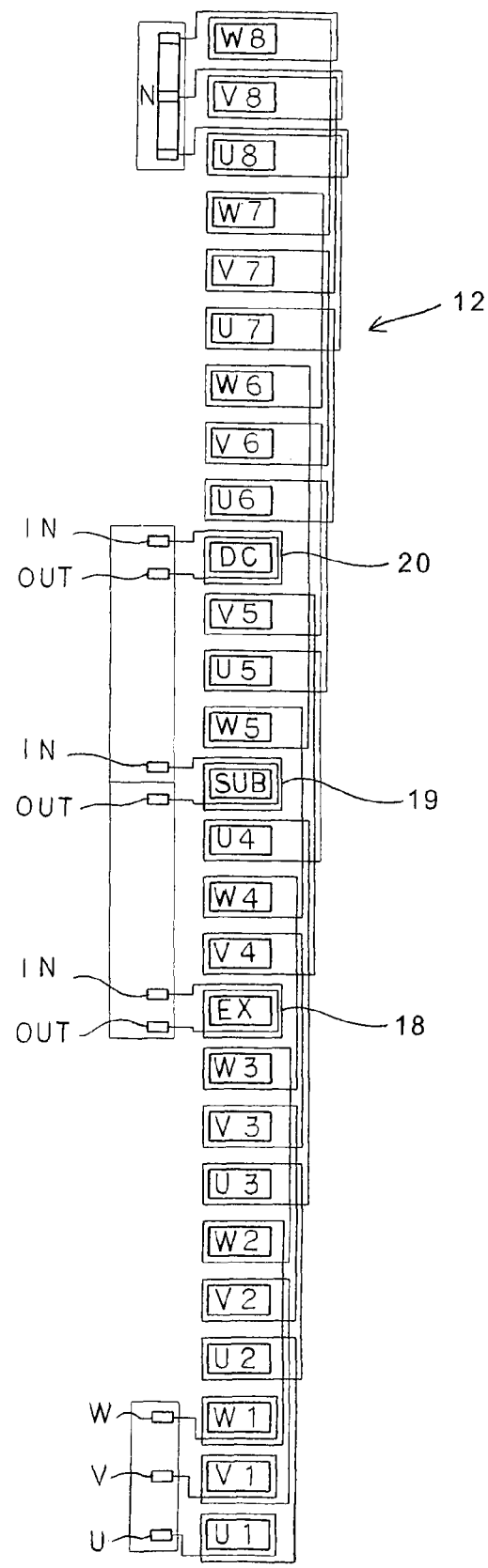
FIG. 7 is a development view of the stator.
Figure 8A:
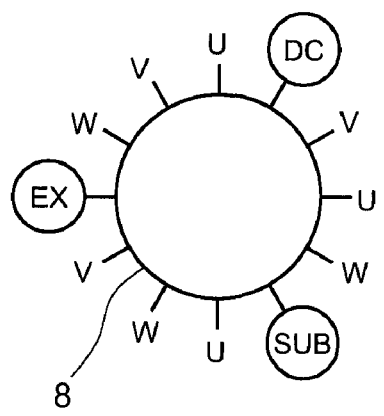
FIGS. 8A, 8B, 8C and 8D are pattern diagram views of a stator showing an embodiment according to a modification of the present invention.
Figure 8B:
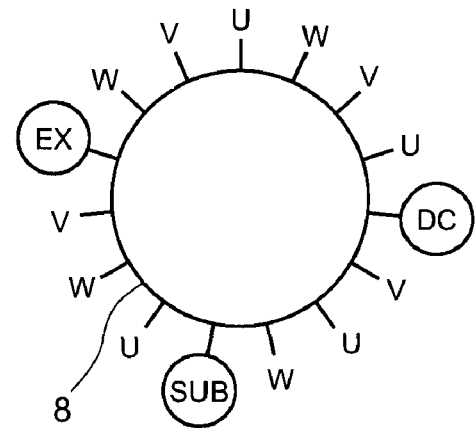
Figure 8C:
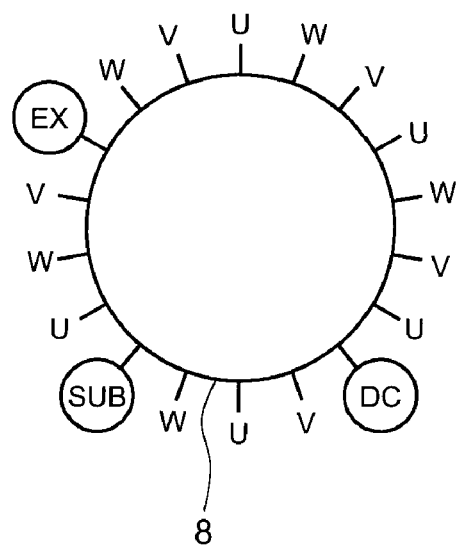
Figure 8D:
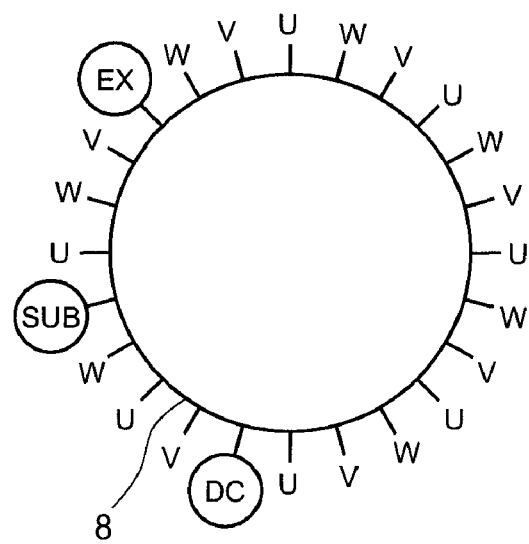

The constitution of the stator will be further described for the stator windings. FIG. 1 is a front view of the stator 8. FIG. 5 is a side view of the stator. FIG. 6 is a wiring diagram of the stator winding. FIG. 7 is a development view of the stator. FIGS. 1 and 5, main windings 17 (17-1 to 17-24), which are respectively wound around twenty-four salient poles 11 (only one salient pole is designated by reference numeral) of the stator core 10, are divided into eight sets in total, each of the sets constituted by three phase (U, V, W). The main windings 17 are designated by reference numerals showing phases. The main windings 17-1, 17-2 and 17-3 of the eight sets of main windings 17 respectively show winding start (U1, V1 and W1) of U, V and W phases. The main windings 17-22 to 17-24 respectively show winding finish (U8, V8 and W8) of the U, V and W phases. One salient pole 11 is empty between the main winding 17-9 (W3) and the main winding 17-10 (V4), and a first auxiliary winding (EX winding) 18 is wound around the salient pole 11. Alternatively, one salient pole 11 is empty between the main winding 17-12 (U4) and the main winding 17-13 (W5), and a second auxiliary winding (sub-winding) 19 is wound around the salient pole 11. Furthermore, one salient pole 11 is empty between the main winding 17-15 (V5) and the main winding 17-16 (U6), and a third auxiliary winding (DC winding) 20 is wound around the salient pole 11.

The wiring of the main windings will be described with reference to FIGS. 6 and 7. As shown in FIGS. 1, 6 and 7, the main windings 17-1 (U1), 17-4 (U2), 17-7 (U3), 17-12 (U4), 17-14 (U5), 17-16 (U6), 17-19 (U7) and 17-22 (U8) are connected in series. A first end thereof, i.e., a winding start lead line of the U phase is connected to a connection terminal 15-4, and a second end thereof, that is, a winding finish lead line is connected to a neutral connection terminal 15-1.

The main windings 17-2 (V1), 17-5 (V2), 17-8 (V3), 17-10 (V4), 17-17 (V5), 17-16 (V6), 17-20 (V7) and 17-23 (V8) are connected in series. One end thereof, i.e., a winding start lead line of the V phase is connected to a connection terminal 15-5, and the other end thereof, i.e., a winding finish lead line is connected to a neutral connection terminal 15-2.

The main windings 17-3 (W1), 17-6 (W2), 17-9 (W3), 17-12 (W4), 17-15 (W5), 17-16 (W6), 17-21 (W7) and 17-24 (W8) are connected in series. One end thereof, i.e., a winding start lead line of the W phase is connected to a connection terminal 15-6, and the other end thereof, i.e., a winding finish lead line is connected to a neutral connection terminal 15-3.

Both the ends of the first auxiliary winding (EX winding) 18 are respectively connected to connection terminals 15-7 and 15-8. Both the ends of the second auxiliary winding (sub-winding) 19 are respectively connected to connection terminals 15-9 and 15-10. Alternatively, both the ends of the third auxiliary winding (DC winding) 20 are respectively connected to connection terminals 15-11 and 15-12.

As shown in FIG. 7, when the stator winding 12 is developed, one of the auxiliary windings (sub-winding 19) is arranged in the most distant position between the winding start (U1, V1, W1) and winding finish (U8, V8, W8) of the main winding. The other auxiliary windings, i.e., the EX winding 18 and the DC winding 20 are respectively arranged on the salient poles 11 located by one set of three-phase main windings away from the auxiliary winding, i.e., in positions with a space formed by three salient poles 11.

That is, after three sets of three-phase main windings from the winding start (main windings are wound around nine salient poles 11) are arranged, the EX winding 18 is wound around the salient pole 11 located in a position in which the following U-phase main winding should be wound in the full main winding type. The main windings are wound around the salient poles 11 located in the next positions in order of the V, W and U phases. That is, the U-phase main winding is thinned out in one position. The sub-winding 19 is then wound around the salient pole 11 located in a position in which the following V-phase main winding should be wound in the full main winding type. Next, the main windings are wound in the next positions in order of the W, U and V phases. That is, the V-phase main winding is thinned out in one position. Then, the DC winding 20 is wound around the salient pole 11 located in a position in which the W-phase main winding should be wound in the full main winding type. Next, three sets of main windings are arranged in order of the U, V and W phases, and the winding is finished. That is, the W-phase main winding is thinned out in one position, and the DC winding 20 is wound in the position.

When the position of the main winding and the position of the auxiliary winding are viewed with reference to FIG. 1, three auxiliary winding 18 to 20 are arranged oppositely with the center of the bobbin 9 referring to the positions (U1, V1, W1 and U8, V8, W8) of the winding start and winding finish of the main windings 17. That is, the winding start and winding finish of the main winding 17 are determined to be arranged so as to become close to the connection terminals 15 (15-1 to 15-6) of one side symmetrically arranged to the center of the bobbin 9. The auxiliary windings 18 to 20 are determined to be arranged so as to become close to the connection terminals 15 (15-7 to 15-12) of the opposite side. Therefore, the leading distance of the main winding 17 and auxiliary winding 18 to 20 to the connection terminal 15 can be shortened, and a sufficient space for connection work by fusing or the like can be secured.

As described above, since the number of times of winding is evenly thinned out only once from the U, V and W phase respectively (the predetermined number of times wound around one salient pole is referred to as one winding for convenience) referring to the main winding 17 and the auxiliary windings are arranged, a required single phase electric source can be output from the auxiliary winding without losing the output balance of the U, V and W phase. Even when the number of the auxiliary windings is increased or decreased without limiting the number of the auxiliary windings to three, the three main winding is preferably thinned out by three windings so that the output balance is not lost. That is, when the auxiliary winding is included in the stator winding 12, the number of times of the windings of the main winding 17 is thinned out by integral multiples of "3". Therefore, the main windings can be wound between the auxiliary windings by the integral multiples of "3" such as three and six. Therefore, for example, even when one auxiliary winding is wound in the stator of this embodiment, the three main windings 17 are thinned out, and two salient poles around which the auxiliary winding is not wound, is empty.

When the number of the auxiliary windings is increased or decreased, the winding start and winding finish of the main winding, and the auxiliary windings 18 to 20 are always arranged so as to be dispersed on the connection terminal 15 symmetrically arranged to the center of the bobbin 9. In this case, a gap between the adjacent auxiliary windings or a gap between the winding start of the main winding and the auxiliary winding adjacent to the winding start is empty by at least one winding (three salient poles) using the main windings 17 of three phases as one set.

For example, in FIGS. 1 and 7, when the EX winding 18 is moved close to the winding start of the main winding 17, the EX winding 18 can be moved to a position in which the main winding 17-7 (U3) is wound. When the DC winding 20 is moved close to the winding finish of the main winding 17, the DC winding 20 can be moved to a position in which the main winding 17-18 (W6) is wound.

In this embodiment, the example in which the number of the salient poles 11 is set to "27" is described. However, the present invention is not limited thereto. The salient poles 11 of the integral multiples of "3" can be provided so as to evenly obtain three-phase output such as twenty-four poles and twenty-seven poles to wind the stator winding 12.

FIGS. 8A, 8B, 8C and 8D are schematic views showing an example of the stator increasing or decreasing the number of the salient poles. The numbers of the salient poles of FIGS. 8A, 8B, 8C and 8D are respectively "12", "15", "18" and "24". In FIGS. 8A, 8B, 8C and 8D, reference numerals U, V and W respectively represent salient poles around which the U phase, V phase and W phase of the main winding are wound. Reference numerals EX, SUB and DC respectively represent salient poles around which the auxiliary winding is wound. As shown in FIGS. 8A, 8B, 8C and 8D, with either stator 8, the auxiliary windings are arranged so as to be dispersed so that at least three or more main windings (the integral multiples of "3") are provided between the two auxiliary windings.

Figure 9:
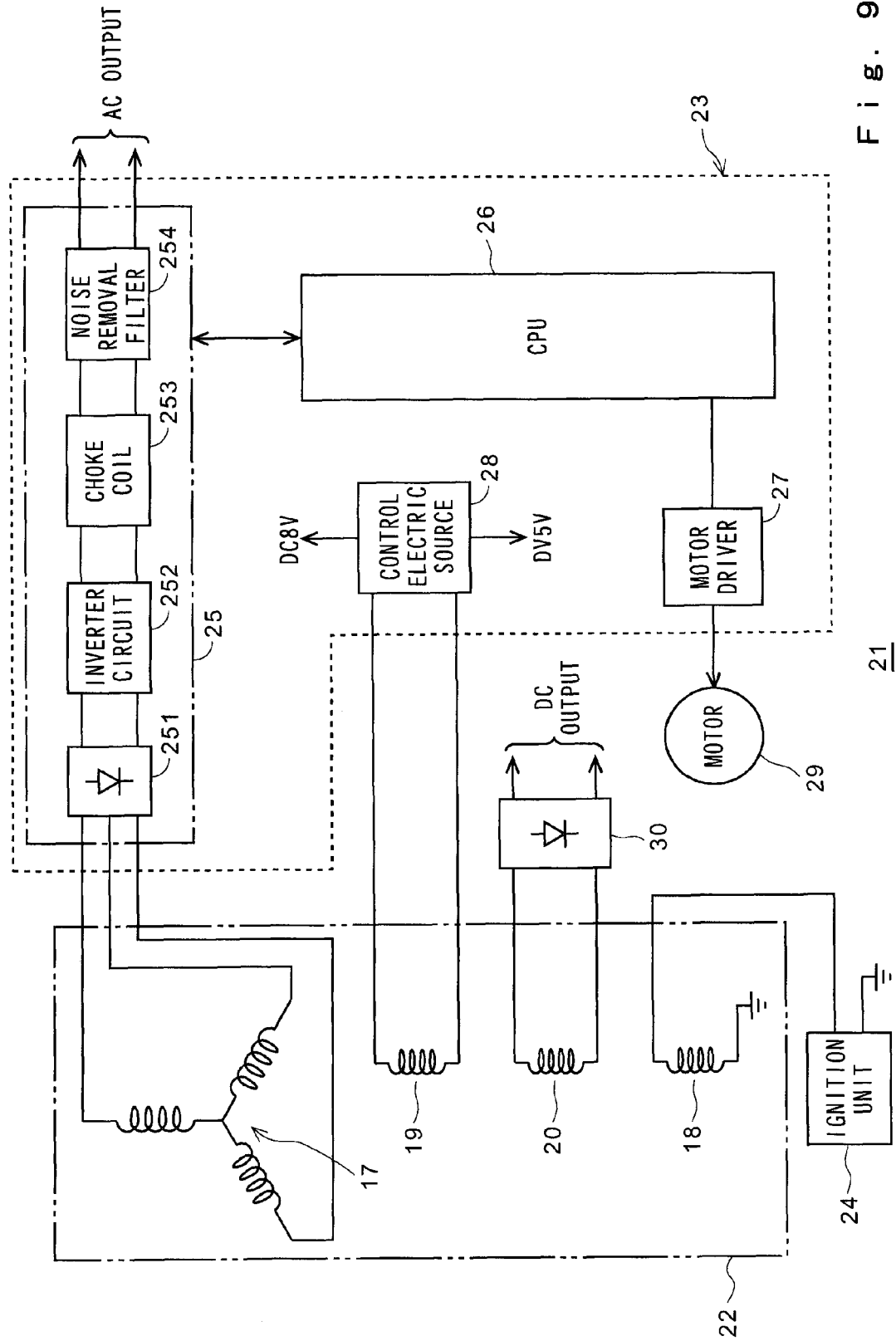
FIG. 9 is a system configuration diagram showing an example of a generation device having the outer rotor type multipolar generator.

FIG. 9 is a system configuration diagram showing an example of a generation device having the outer rotor type multipolar generator. In FIG. 9, a generation device 21 is provided with an outer rotor type multipolar generator 22 having the constitution described above, an output control device 23 for the electric generator 22, and an ignition unit 24 for an engine (not shown) driving the electric generator 22. The output control device 23 includes an inverter block 25, a CPU 26, a motor driver 27, and a control electric source device 28. The three-phase output of the main winding 17 of the electric generator 22 is rectified by a rectification circuit 251 of the inverter block 25. Furthermore, the output is converted into an alternating electric current having predetermined frequency (for example, the frequency of commercial electric source) by an inverter circuit 252, and it is output as single phase AC through a choke coil 253 and a noise removal filter 254 or the like.

The output of the sub-winding 19 is input into the control electric source device 28, and the control electric source device 28 generates direct current 5 V and a control electric source of 8 V. The control electric source is used as an electric source for a throttle monitor 29 and an inverter block 25.

The output of the DC winding 20 is rectified by a rectification circuit 30, and is used as a DC electric source for LED lighting for displaying which is not shown.

The output of the EX winding 18 is supplied to the ignition unit 24, and is used as an electric source for ignition.

The CPU 26 controls the inverter block 25 based on the rotation number of the engine and the output voltage of the inverter block 25, or the like, and controls the motor driver 27 to drive the throttle motor 29.

The above embodiment describes the constitution of the stator 8 containing the auxiliary windings 18 to 20. However, the bobbin 9 of this stator 8 can be also used as a common part as it is for the full main winding type which does not contain the auxiliary windings 18 to 20. For example, the U phase main winding in place of the EX winding 18 may be wound around the salient pole 11 around which the EX winding 18 is wound in the stator 8 described with the reference to FIG. 1. The V phase main winding in place of the sub-winding 19 may be wound around the salient pole 11 around which the sub-winding 19 is wound. The W phase main winding in place of the DC winding 20 may be wound around the salient pole 11 around which the DC winding 20 is wound. When the bobbin 9 is used as the full main winding type, the connection terminals 15-7 to 15-12 are empty.

As described above, the present invention was described according to the preferred embodiment. However, the present invention is not limited to this embodiment. The number of the salient poles and the number of the auxiliary windings or the like can be optionally modified and be carried out without departing from scope of the invention described in claims.

What is claimed is:

1. An outer rotor type multipolar generator comprising:
an annular stator core having an outer periphery on which salient poles of integral multiples of "3" of 12 or more are arranged; and
three-phase main windings wound around the salient poles that are covered with an insulating bobbin,
wherein an auxiliary winding in place of the main windings is wound around at least one of three salient poles arranged only at intervals of integral multiples of "3" of the salient poles wound with the main windings apart from each other, and in the case of the number of the auxiliary windings is 2 or less, the winding is not wound around the salient pole around which the other auxiliary winding should be wound.

2. The outer rotor type multipolar generator according to claim 1, wherein the bobbin comprises a region overhung toward an internal diameter side of the annular stator, and main winding connection terminals and auxiliary winding connection terminals are fixed to the region, wherein the main winding connection terminals and the auxiliary winding connection terminals respectively connecting the main windings and the auxiliary windings to external windings.

3. The outer rotor type multipolar generator according to claim 2, wherein the main windings are bonded to the main winding connection terminals by fusing, and the auxiliary windings are bonded to the auxiliary winding connection terminals by fusing.

4. An outer rotor type multipolar generator comprising:
an annular stator core having an outer periphery on which salient poles of integral multiples of "3" of 12 or more are arranged; and
three-phase main windings wound around a subset of the salient poles that are covered with an insulating bobbin,
wherein at least three of the salient poles are auxiliary winding poles that are not wound with the main windings, said auxiliary winding poles being arranged only at intervals of integral multiples of "3" of the salient poles wound with main windings apart from each other, with an auxiliary winding wound around at least one of the auxiliary winding poles.

* * * * *